US012807798B2

(12) United States Patent
Chen et al.

(10) Patent No.: US 12,807,798 B2
(45) Date of Patent: Nov. 24, 2026

(54) POLYPROPYLENE COMPOSITION AND PREPARATION METHOD THEREFOR

(71) Applicant: Kingfa Sci. & Tech. Co., Ltd., Guangzhou (CN)

(72) Inventors: Jiajie Chen, Guangzhou (CN); Xianbo Huang, Guangzhou (CN); Nanbiao Ye, Guangzhou (CN); Guofeng Wu, Guangzhou (CN); Zhongfu Luo, Guangzhou (CN); Bo Yang, Guangzhou (CN); Zhengya Ding, Guangzhou (CN)

(73) Assignee: Kingfa Sci. & Tech. Co., Ltd., Guangzhou (CN)

( * ) Notice: Subject to any disclaimer, the term of this patent is extended or adjusted under 35 U.S.C. 154(b) by 1048 days.

(21) Appl. No.: 17/821,498

(22) Filed: Aug. 23, 2022

(65) Prior Publication Data

US 2023/0002604 A1 Jan. 5, 2023

Related U.S. Application Data

(63) Continuation of application No. PCT/CN2020/130131, filed on Nov. 19, 2020.

(30) Foreign Application Priority Data

Feb. 28, 2020 (CN) ......................... 202010129315.1

(51) Int. Cl.
*C08L 23/14* (2006.01)

(52) U.S. Cl.
CPC ......... *C08L 23/14* (2013.01); *C08L 2205/025* (2013.01); *C08L 2205/035* (2013.01)

(58) Field of Classification Search
CPC ............... C08L 23/14; C08L 2205/025; C08L 2205/035
See application file for complete search history.

(56) References Cited

U.S. PATENT DOCUMENTS

| | | | |
|---|---|---|---|
| 2004/0044111 A1 | 3/2004 | Kakarala et al. | |
| 2015/0166779 A1 | 6/2015 | Diehl et al. | |
| 2019/0048176 A1* | 2/2019 | Yang | C08L 23/06 |

FOREIGN PATENT DOCUMENTS

| | | |
|---|---|---|
| CN | 106752633 A | 5/2017 |
| CN | 106939098 A | 7/2017 |
| CN | 108250588 A | 7/2018 |
| CN | 109651710 A | 4/2019 |
| CN | 109971076 A | 7/2019 |
| CN | 109988364 A | 7/2019 |
| CN | 110903555 A | 3/2020 |
| CN | 111253682 A | 6/2020 |

OTHER PUBLICATIONS

English machine translation of CN 109971076 (Year: 2019).*
International Search Report and Written Opinion of counterpart PCT application No. PCT/CN2020/130131, mailed Dec. 31, 2020.

* cited by examiner

*Primary Examiner* — Angela C Scott
(74) *Attorney, Agent, or Firm* — FINNEGAN, HENDERSON, FARABOW, GARRETT & DUNNER LLP

(57) ABSTRACT

The present invention discloses a polypropylene composition. A resin matrix is composed of copolymerized polypropylene and branched polyethylene with special parameters, such that the resin matrix has a low crystallization tendency, thereby improving spraying adhesion of a surface of the resin matrix. A polyolefin elastomer (POE) in bimodal distribution is further used to improve the appearance after molding.

7 Claims, No Drawings

POLYPROPYLENE COMPOSITION AND PREPARATION METHOD THEREFOR

CROSS-REFERENCE TO RELATED APPLICATION

This is a continuation of International Application No. PCT/CN2020/130131, filed Nov. 19, 2020, which claims the benefit of Chinese Patent Application NO. 202010129315.1, filed Feb. 28, 2020, all of which are incorporated herein by reference in the entirety.

TECHNICAL FIELD

The present invention relates to the field of polymer material technologies, and in particular, to a polypropylene composition and a preparation method therefor.

BACKGROUND

Polypropylene (PP) material, as one of the five general-purpose plastics, has the advantages of low density, low costs, convenience in molding, etc., which accords with the current development trend of environmental protection and light weight in the vehicle industry. After being modified, the polypropylene material is improved in overall performance, and the polypropylene material is widely used in plastic exterior parts of vehicles such as a bumper, a fender, a wheel eyebrow, and a side skirt. With rapid development of the vehicle industry, consumers' requirements for vehicle styling, vehicle body colors, etc. are gradually enhanced. Vehicle body materials are mostly metal materials such as alloy steel or alloy aluminum, and are sprayed. Considering an overall aesthetic sense of vehicle appearance, plastic exterior parts of vehicles are mostly decorated by spraying metal appearance paint to match a metal spraying effect.

However, the polypropylene material, as a substrate material of exterior spray parts of vehicles, has certain disadvantages. For example, polypropylene molecules are nonpolar molecules, have relatively low surface tension and relatively poor adhesion to paint, and are prone to poor corner spraying, poor adhesion, etc. In addition, the idea of environmental protection is practiced in all walks of life. Currently, water-based paint is used instead of oil-based paint in the vehicle industry. The water-based paint uses water as a solvent, which greatly reduces environmental pollution and is friendly to humans and the environment. However, adhesion of the water-based paints to plastics is slightly worse than that of the oil-based paints. Therefore, the water-based paint spraying performance of a material needs to be improved. In addition, the flow mark defects of polypropylene in injection molding mostly occur in workpieces with a relatively large area and a relatively long plastic material flow, and there is a high probability that the defects appear in vehicle bumpers, fenders, wheel eyebrows, side skirts, etc. Some spraying colors and processes determine that a paint film is relatively thin and cannot completely cover flow marks, which affects the vehicle appearance.

Currently, there are mainly two methods for improving adhesion of polypropylene composite to paint. The first method is to oxidize a surface of a polypropylene plastic part before spraying. Commonly used methods include flame treatment, corona treatment, plasma treatment, etc. to form oxidative polar groups, such as carbonyl and carboxyl, on the surface of polypropylene, so as to improve spraying performance. This method requires multi-step off-line treatment on a production line, has high costs of personnel, materials and devices and low efficiency, and cannot implement high-speed production with injection molding and spraying colinear. The second method is resin matrix modification, which improves the surface activity of a material by adding a polypropylene graft or other polar additives. Chinese patent application No. CN 106752633A discloses a polypropylene material for vehicle bumpers, which has an excellent combination of properties such as impact resistance, fluidity, rigidity, thermal stability, dimensional stability, and sprayability, and which is prepared by extruding and blending the mixture of polypropylene, polyethylene, a thermoplastic elastomer, a polar copolymer, a mineral filler, and a processing aid through twin-screw extruder. Chinese patent application No. CN 109988364A discloses a polypropylene composition which is easy to be sprayed on, and the polypropylene is prepared by extruding and blending a polypropylene resin, POE, a graft, a cyclic olefin copolymer, a stabilizer, and a colorant through twin-screw extruder. The adhesion property of paint with the polypropylene composite material in a high-pressure flushing test has been further improved through the synergistic effect of the graft and the cyclic olefin copolymer, as well as the good compatibility of the added graft and materials with the polypropylene, and the cyclic olefin copolymer. Chinese patent application No. CN106939098A discloses a polypropylene resin composition, which can suppress the occurrence of flow marks by using a heterophasic propylene copolymer, high-density polyethylene, and ethylene-α-olefin random copolymer. However, the impact of the content of ethylene propylene rubber in the heterophasic propylene copolymer on the property of the composition is not disclosed. Also, the added high-density polyethylene cannot inhibit crystallization of the composition.

SUMMARY

An objective of the present invention is to provide a polypropylene composition, which overcomes the defects of poor adhesion of a surface of a polypropylene resin to paint. Further, an elastomer with a bimodal molecular weight distribution overcomes the flow mark defects of polypropylene in injection molding which occurs after the addition of an elastomer, and improves adhesion.

Another objective of the present invention is to provide a method for preparing the foregoing polypropylene composition.

The present invention is implemented by the following technical solutions:

A polypropylene composition comprises the following components in parts by weight:

55-75 parts of copolymerized polypropylene; and 3-8 parts of branched polyethylene, wherein the copolymerized polypropylene has a weight average molecular weight of 60,000-75,000 g/mol and a molecular weight distribution index less than or equal to 4.0, and wherein the mass percentage of ethylene propylene rubber in a copolymerized polypropylene resin is 8.5%-13.5%; wherein the branched polyethylene has a weight average molecular weight of 320,000-350,000 g/mol and a degree of branching in a range of 11.0-15.0; in the branches, the content of a methyl branch ranges from 45.0% to 55.0% based on the total number of the branches, the content of an ethyl branch ranges from 30.0% to 40.0% based on the total number of the branches, and the content of a propyl branch and branches containing four or more carbon atoms ranges from 15.0% to 25.0% based on the total number of the branches.

Commercial copolymerized polypropylene used for injection molding generally has a weight average molecular weight of 30,000-800,000 and a molecular weight distribution index ($M_w/M_n$, namely polydispersity index) in a range of 2.0-10.0. In the present invention, a microstructure of the copolymerized polypropylene was investigated, and features the following three aspects: I. A narrow molecular weight distribution with a molecular weight distribution index less than or equal to 4.0 can effectively reduce the content of the low-molecular-weight polypropylene part in the copolymerized polypropylene, weaken the crystallization tendency of the polypropylene polymer, improve spraying adhesion of polypropylene, and improve water-based paint spraying performance of the polypropylene. II. A weight average molecular weight of 60,000-75,000 g/mol enables the copolymerized polypropylene to have relatively good fluidity, which broadens the molding processing window and improves the molding appearance. III. The weight percentage of ethylene propylene rubber is 8.5%-13.5%, which provides a balance of rigidity and toughness of the material and reduces coalescence of the high-viscosity ethylene propylene rubber during processing, and thus improves the molding appearance.

The content of each branch in the branched polyethylene is determined by the combination of carbon nuclear magnetic resonance (13CNMR) and a two-dimensional DEPT spectrum. The combination of the polyethylene and the copolymerized polypropylene can effectively reduce regularity of the chain segments, thereby reducing crystallization and improving water-based paint spraying adhesion of the polypropylene as well as the water-based paint spraying performance of the polypropylene.

Commercial branched polyethylene generally has a molecular weight of 50,000-400,000 g/mol and a degree of branching in a range of 1.5-17.0; in the branches, the content of a methyl branch ranges from 45.0% to 75.0% based on the total number of the branches, the content of an ethyl branch ranges from 5.0% to 43.0% based on the total number of the branches, and the content of a propyl branch and branches containing four or more carbon atoms ranges from 5.0% to 27.0% based on the total number of the branches. The degree of branching in the present disclosure refers to the number of carbon atoms of the branches in every one thousand carbon atoms of the main chain. In the present invention, the microstructure of the branched polyethylene was investigated, and found to be characterized by a high degree of branching, and thus after blending with polypropylene, the chain segment regularity can be reduced so as to reduce crystallization.

The inventors found through experiments that if polyethylene with low crystallinity was used instead, the crystallinity of the copolymerized polypropylene could not be reduced synergistically.

The polypropylene composition further comprises 0-20 parts by weight of a copolymer which is at least one of an ethylene-1-octene copolymer with a bimodal molecular weight distribution and an ethylene-1-butene copolymer with a bimodal molecular weight distribution.

It was found through experiments that the addition of an elastomer may improve spraying adhesion, but can affect the appearance, resulting in flow marks during injection molding. When the ethylene-1-octene copolymer with a bimodal molecular weight distribution and/or the ethylene-1-butene copolymer with a bimodal molecular weight distribution are used, no flow mark appears, and the spraying adhesion is improved.

Preferably, a copolymer is selected from the ethylene-1-octene copolymer with a bimodal molecular weight distribution.

The molecular weight of ethylene-1-octene copolymer and ethylene-1-butene copolymer can be in bimodal molecular weight distribution or in monomodal molecular weight distribution. A bimodal distribution ethylene-octene copolymer has a bimodal molecular weight distribution. The bimodal distribution ethylene-octene copolymer may have obvious molecular peaks in a weight average molecular weight range of 60,000-80,000 and in a weight average molecular weight range of 150,000-170,000, respectively. In the present invention, the microstructure of the foregoing elastomer was investigated, and found to be characterized by a bimodal molecular weight distribution state, which improves the appearance during molding.

To increase strength of the polypropylene composition, a certain amount of inorganic filler may be added. The polypropylene composition further comprises 0-20 parts by weight of inorganic filler.

The inorganic filler is selected from 5000-10000 mesh talcum powder.

To improve oxidation resistance of the polypropylene composition, the polypropylene composition further comprises 0-3 parts by weight of antioxidant, which may be at least one of a hindered phenolic antioxidant and an alcohol ester antioxidant, which specifically may be tetra[β-(3,5-di-tert-butyl-4-hydroxyphenyl)propionic acid]pentaerythritol ester, tri[2,4-di-tert-butylphenyl]phosphite, β-(3,5-di-tert-butyl-4-hydroxyphenyl)propionic acid n-octadecyl ester, dilauryl thiodipropionate, etc.

A method for preparing the foregoing polypropylene composition comprises the following steps: mixing the copolymerized polypropylene, the polyethylene, an inorganic filler, and an antioxidant uniformly based on a ratio and then extruding and granulating the mixture by a twin-screw extruder to obtain the polypropylene composition; wherein the temperature along the screws is distributed as 180° C.-210° C.-200° C., and the rotation speed is 400-700 revolutions per minute.

The present invention has the following beneficial effects:

In the present invention, crystallization of the resin matrix can be suppressed by melt blending the copolymerized polypropylene and the branched polyethylene having specific parameters, which improves spraying adhesion of the polypropylene composition and enhances the water-based paint spraying performance of the polypropylene.

Further, by adding ethylene-1-octene copolymer and/or ethylene-1-butene copolymer which are in specific bimodal molecular weight distribution, the occurrence of flow marks caused by the addition of elastomers can be effectively suppressed, and thus the spraying adhesion is improved, thereby further improving the appearance during molding.

DESCRIPTION OF EMBODIMENTS

The present invention is described in detail below with reference to specific embodiments. The following embodiments help a person skilled in the art to further understand the present invention, but do not limit the present invention in any way. It should be noted that for a person of ordinary skill in the art, several variations and improvements can be further made without departing from the conception of the present invention, and shall fall within the protection scope of the present invention.

Raw materials used in the present invention are as follows:

polypropylene A: copolymerized polypropylene, with a weight average molecular weight of about 67,000-70,000 g/mol and a molecular weight distribution index of 3.5, where the mass percentage of ethylene propylene rubber in the copolymerized polypropylene resin is 9.5%;

polypropylene B: copolymerized polypropylene, with a weight average molecular weight of about 70,000-73,000 g/mol and a molecular weight distribution index of 4.0, where the mass percentage of ethylene propylene rubber in the copolymerized polypropylene resin is 10.2%;

polypropylene C: copolymerized polypropylene, with a weight average molecular weight of about 78,000-80,000 g/mol and a molecular weight distribution index of 4.0, where the mass percentage of ethylene propylene rubber in the copolymerized polypropylene resin is 18.6%;

polypropylene D: copolymerized polypropylene, with a weight average molecular weight of about 76,000-79,000 g/mol and a molecular weight distribution index of 4.9, where the mass percentage of ethylene propylene rubber in the copolymerized polypropylene resin is 13.4%;

polypropylene E: homo-polypropylene, with a weight average molecular weight of about 72,000 g/mol and a molecular weight distribution index of 3.5;

polypropylene F: copolymerized polypropylene, with a weight average molecular weight of about 90,000 g/mol and a molecular weight distribution index of 5.6, where the mass percentage of ethylene propylene rubber in the copolymerized polypropylene resin is 7.5%;

polyethylene A: with a weight average molecular weight of about 325,000-335,000 g/mol and a degree of branching of 11.5, where in the branches, the content of a methyl branch is 50.5% based on the total number of the branches, the content of an ethyl branch is 31.5% based on the total number of the branches, and the content of a propyl branch and branches containing four or more carbon atoms is 18.0% based on the total number of the branches;

polyethylene B: with a weight average molecular weight of about 340,000-350,000 g/mol and a degree of branching of 14.0, where in the branches, the content of a methyl branch is 46.0% based on the total number of the branches, the content of an ethyl branch is 34.5% based on the total number of the branches, and the content of a propyl branch and branches containing four or more carbon atoms is 19.5% based on the total number of the branches;

polyethylene C: with a weight average molecular weight of about 270,000-290,000 g/mol and a degree of branching of 10.0, where in the branches, the content of a methyl branch is 68.5% based on the total number of the branches, the content of an ethyl branch is 25.5% based on the total number of the branches, and the content of a propyl branch and branches containing four or more carbon atoms is 6.0% based on the total number of the branches;

polyethylene D: linear polyethylene, with a weight average molecular weight of about 260,000-280,000 g/mol;

polyethylene E: high density polyethylene, with a weight average molecular weight of about 350,000-370,000 g/mol;

ethylene-1-octene copolymer A: with a bimodal molecular weight distribution and a weight average molecular weight of 120,000-130,000 (with peak 1 having a weight average molecular weight of 70,000-71,000 and a peak area percentage of 39.5%, and peak 2 having a weight average molecular weight of 160,000-161,000 and a peak area percentage of 53.5%);

ethylene-1-octene copolymer B: with a monomodal molecular weight distribution and a weight average molecular weight of 96,000-106,000 (with peak 1 having a weight average molecular weight of 97,000-99,000 and a peak area percentage of 93.5%);

an ethylene-1-butene copolymer: with a bimodal molecular weight distribution and a weight average molecular weight of about 110,000-125,000 (with peak 1 having a weight average molecular weight of 73,000-75,000 and a peak area percentage of 40.5%, and peak 2 having a weight average molecular weight of 157,000-160,000 and a peak area percentage of 52.5%);

talcum powder: 8,000 mesh; and antioxidant 1010.

Method for preparing each polypropylene composition in the embodiments and the comparative examples: Components were uniformly mixed based on the ratio and then extruded and granulated by a twin-screw extruder to obtain the polypropylene composition, where the temperature along the screws were distributed as 180° C.-210° C.-200° C., and the rotation speed is 600 revolutions per minute.

Square plate obtained by injection molding: a 100*100*3 mm square plate mold, used for a grid scratch test, a diesel fuel resistance test, and an antifreeze resistance test.

An Archimedean ring obtained by injection molding: with a length of 1000 mm, a width of 50 mm, and a thickness of 2 mm, used for a flow mark test.

Injection molding machine model: Borche BS320-III. Injection molding condition: injection molding temperature of 200° C. in an entire region, injection pressure of 70% in the entire region, holding pressure of 70% in the entire region, and cooling time of 8 seconds.

A paint spraying process was provided by Shanghai Fanuc Robot Co., Ltd.

The following tests were performed after injection molding and paint spraying.

Method for testing each property:

(1) Grid scratch test: Operation was performed based on ISO2409. A grid-scribing knife was selected based on a thickness of a coating and used for scribing to a base material, and an adhesive tape (recommended 3M-898#adhesive tape, Teasa-4657 or an adhesive tape with similar property as the foregoing two adhesive tapes) was used for pasting. To ensure good contact with the coating, the adhesive tape was rubbed heavily and evenly with fingertips and then kept for 5 min, maintained at a 60° tearing angle with the surface of a test sample, and peeled off manually within 1 second. The peeling of the coating was observed. Generally, the coating of vehicle paint has a thickness of 60-120 μm, a distance between knife marks is 2 mm, and there are six knife marks.

(2) Flow mark test: Positions of flow marks were evaluated. Length distances correspond to where the flow marks start to be visually observable on Archimedean ring samples after injection molding. There were at least 3 testers. A mathematical average of the data was taken, the result of which has been rounded to the nearest integer. If there was no flow mark seen with naked eyes, "No flow mark" was marked.

(3) Diesel fuel resistance test: Test sample pieces were placed in diesel fuel at 23±2° C. for impregnation. After impregnation for 0.5 hour, the test sample pieces were taken out and placed in air at 23±2° C. for storage for 24 hours, and then the test sample pieces were wiped clean of medium with a cleaning cloth impregnated with water (or an industrial dedusting agent, or a cleaning solution) and cleaning gasoline, and then evaluation was performed.

(4) Antifreeze resistance test: Filter paper was impregnated with antifreeze and applied to outer surfaces of samples, and surface changes of the products were observed after 1 hour.

TABLE 1

Polypropylene composition formulas (parts by weight) and test results of various properties in Embodiments

| | Embodiment 1 | Embodiment 2 | Embodiment 3 | Embodiment 4 | Embodiment 5 | Embodiment 6 | Embodiment 7 |
|---|---|---|---|---|---|---|---|
| Polypropylene A | 70 | | 70 | | | | 70 |
| Polypropylene B | | 70 | | 70 | 70 | 70 | |
| Polyethylene A | 3 | 5 | | 5 | 5 | 5 | |
| Polyethylene B | | | 8 | | | | 8 |
| Ethylene-1-octene copolymer A | | | | 15 | | | 10 |
| Ethylene-1-octene copolymer B | | | | | 15 | | |
| Ethylene-1-butene copolymer | | | | | | 15 | |
| Talc | | | | | | | 20 |
| Antioxidant 1010 | 0.4 | 0.4 | 0.4 | 0.4 | 0.4 | 0.4 | 0.4 |
| Grid test paint retention rate (%) | 100 | 100 | 100 | 100 | 100 | 100 | 100 |
| Adhesion (N/m) after the diesel fuel resistance test | 805 | 820 | 826 | 876 | 855 | 832 | 882 |
| Adhesion (N/m) after the antifreeze resistance test | 830 | 846 | 851 | 898 | 883 | 861 | 913 |
| Positions of flow marks (mm) | No flow mark | No flow mark | No flow mark | No flow mark | 145 | No flow mark | No flow mark |

It can be learned from Embodiment 4 or 5 that the ethylene-1-octene copolymer with a bimodal molecular weight distribution improved flow marks significantly better than the ethylene-1-octene copolymer with a monomodal molecular weight distribution.

It can be learned from Embodiment 4 or 6 that the ethylene-1-octene copolymer with a bimodal molecular weight distribution is preferred.

TABLE 2

Polypropylene composition formulas (parts by weight) and test results of various properties in Comparative Examples 1 to 4

| | Comparative Example 1 | Comparative Example 2 | Comparative Example 3 | Comparative Example 4 |
|---|---|---|---|---|
| Polypropylene C | 70 | | | |
| Polypropylene D | | 70 | | |
| Polypropylene E | | | 70 | |
| Polypropylene F | | | | 70 |
| Polyethylene A | 3 | 3 | 3 | 3 |
| Antioxidant 1010 | 0.4 | 0.4 | 0.4 | 0.4 |

TABLE 2-continued

Polypropylene composition formulas (parts by weight) and test results of various properties in Comparative Examples 1 to 4

| | Comparative Example 1 | Comparative Example 2 | Comparative Example 3 | Comparative Example 4 |
|---|---|---|---|---|
| Grid test paint retention rate (%) | 85.5 | 84.2 | 66.3 | 82.3 |
| Adhesion (N/m) after the diesel fuel resistance test | 725 | 721 | 523 | 689 |
| Adhesion (N/m) after the antifreeze resistance test | 765 | 748 | 562 | 732 |
| Positions of flow marks (mm) | 180 | 204 | 260 | 195 |

It can be learned from Comparative Examples 1 to 4 that it is difficult to reduce the crystallinity of the blended resin matrix if the molecular weight distribution index of the polypropylene is greater than 4.0 or the content of the ethylene propylene rubber is excessively high or excessively low.

TABLE 3

Polypropylene composition formulas (parts by weight) and test results of various performance in Comparative Examples 5 to 7

| | Comparative Example 5 | Comparative Example 6 | Comparative Example 7 |
|---|---|---|---|
| Polypropylene A | 70 | 70 | 70 |
| Polyethylene C | 3 | | |
| Polyethylene D | | 3 | |
| Polyethylene E | | | 3 |
| Antioxidant 1010 | 0.4 | 0.4 | 0.4 |
| Grid test paint retention rate (%) | 92.5 | 89.5 | 82.3 |
| Adhesion (N/m) after the diesel fuel resistance test | 754 | 732 | 634 |
| Adhesion (N/m) after the antifreeze resistance test | 782 | 753 | 652 |
| Positions of flow marks (mm) | 285 | 265 | 125 |

It can be learned from Comparative Example 5 that when the degree of branching is low and the content of branches with four or more carbon atoms is relatively low, the effect of reducing the crystallinity of the polypropylene resin matrix cannot be achieved.

It can be learned from Comparative Example 6 or 7 that linear polyethylene and high-density polyethylene cannot reduce the crystallinity of the polypropylene resin matrix as well.

What is claimed is:

1. A polypropylene composition, comprising the following components in parts by weight:

55-75 parts of copolymerized polypropylene; and 3-8 parts of branched polyethylene, wherein the copolymerized polypropylene has a weight average molecular weight of 60,000-75,000 g/mol and a molecular weight distribution index of being less than or equal to 4.0; wherein the copolymerized polypropylene comprises ethylene propylene rubber, and the mass percentage of ethylene propylene rubber in the copolymerized polypropylene resin is 8.5%-13.5%; wherein the branched polyethylene has a weight average molecular weight of 320,000-350,000 g/mol and a degree of branching in a range of 11.0-15.0; and wherein in the branches, the content of a methyl branch ranges from 45.0% to 55.0% based on the total number of the branches, the content of an ethyl branch ranges from 30.0% to 40.0% based on the total number of the branches, and the content of a propyl branch and branches containing four or more carbon atoms ranges from 15.0% to 25.0% based on the total number of the branches.

2. The polypropylene composition according to claim 1, further comprising 0-20 parts by weight of a copolymer, wherein the copolymer is at least one of an ethylene-1-octene copolymer with a bimodal molecular weight distribution and an ethylene-1-butene copolymer with a bimodal molecular weight distribution.

3. The polypropylene composition according to claim 2, wherein the copolymer is an ethylene-1-octene copolymer with a bimodal molecular weight distribution.

4. The polypropylene composition according to claim 3, wherein the ethylene-1-octene copolymer with a bimodal molecular weight distribution has peaks in a weight average molecular weight range of 60,000-80,000 and in a weight average molecular weight range of 150,000-170,000, respectively.

5. The polypropylene composition according to claim 1, further comprising 0-20 parts by weight of an inorganic filler.

6. The polypropylene composition according to claim 5, wherein the inorganic filler is selected from 5000-10000 mesh talcum powder.

7. The polypropylene composition according to claim 1, further comprising 0-3 parts by weight of an antioxidant.

* * * * *